United States Patent [19]
Morgavi et al.

[11] Patent Number: 5,739,835
[45] Date of Patent: Apr. 14, 1998

[54] COLOR PRINTING MACHINE

[75] Inventors: Paul Morgavi, La Ciotat; Jean-Paul Marietti, Mimet; Jean-Jacques Oubrayrie, Allauch, all of France

[73] Assignee: Gemplus Card International, Gemenos, France

[21] Appl. No.: 394,019

[22] Filed: Feb. 23, 1995

[30] Foreign Application Priority Data

Feb. 24, 1994 [FR] France ................... 94 02116

[51] Int. Cl.⁶ ........................................ B41J 2/325
[52] U.S. Cl. ............................ 347/176; 347/197
[58] Field of Search ........................ 347/172, 174, 347/176, 197, 198, 217, 212; 400/120.02, 120.04, 120.16, 120.17, 207, 120.18

[56] References Cited

U.S. PATENT DOCUMENTS

| | | |
|---|---|---|
| 4,797,016 | 1/1989 | Lahr . |
| 4,893,951 | 1/1990 | Iwatani et al. . |
| 5,185,315 | 2/1993 | Sparer . |

FOREIGN PATENT DOCUMENTS

| | | |
|---|---|---|
| 0 290 845 | 11/1988 | European Pat. Off. . |
| 39 07 415 | 9/1990 | Germany . |
| 62-85976 | 4/1987 | Japan . |
| 1-204778 | 8/1989 | Japan . |
| 92/09052 | 5/1992 | WIPO . |

*Primary Examiner*—Huan H. Tran
*Attorney, Agent, or Firm*—Pollock, Vande Sande & Priddy

[57] ABSTRACT

In a machine for the color printing of cards, the different primary colors borne by the ribbon are deposited on the card by successive operations in which this card passes beneath the same thermal printer head by a series of back-and-forth motions. To this end, the primary colors of a sequence are separated by separators which are different from the indicators between each sequence, and these separators and indicators are detected by a detection device.

12 Claims, 4 Drawing Sheets

5,739,835

1

COLOR PRINTING MACHINE

BACKGROUND OF THE INVENTION

1. Field of the Invention

The present invention relates to a high-definition color printer for cards, particularly for cards made of plastic.

2. Description of the Prior Art

There are known technologies for the printing onto a rigid medium wherein first of all, printing is done on paper, and then this paper is bonded or laminated to the rigid medium. The implementation of these technologies does not provide for indelible printing since the quality of the image or of the text depends on the quality of the bonding or lamination as well as on the quality of the protective film subjected to wear and tear by successive use.

Direct monochromatic printing on a flat plastic medium was the object of the published French patent application No. 2 669 267. The use of this method in trichromatic printing makes it necessary to have as many thermal printer heads as there are colors, whence the need for a substantial amount of space and low-speed printing.

An object of the invention is to make a color printing machine that overcomes the above-mentioned drawbacks and, to this effect the invention consists in resorting to several successive printing cycles for the same thermal printer head under which a sequential color ribbon runs.

SUMMARY OF THE INVENTION

The invention relates to a machine for the color printing of cards, particularly cards made of plastic, comprising:

- a ribbon used as a support for coloring agents and substances arranged in a sequential order, each sequence of coloring agents and substances being preceded by an indicator,
- a thermal printer head enabling the transfer of a coloring agent or substance from the ribbon to a medium by thermal effect,
- a first driving means to drive the ribbon under the thermal printer head,
- a second driving means to drive the card to be printed under the thermal printer head and the ribbon,
- a third driving means to shift the thermal printer head so as to make it approach or move away from the card, wherein:
- the ribbon has separators between the coloring agents and substances of a sequence,
- a first detection device detects the separators and indicators during the running of the ribbon,
- a second detection device detects the entry and exit of the card under the thermal printer head,
- a third detection device detects the position of the thermal printer head, and
- a control system, including the first, second and third detection devices, controls the first, second and third driving means so as to present the card to be printed under the printer head as many times as there are coloring agents and substances in the sequence.

In another embodiment of the invention, the thermal printer head is provided with a flattening device that modifies the escape angle of the ribbon.

BRIEF DESCRIPTION OF THE DRAWINGS

Other features and advantages of the present invention shall appear from the following description of a particular embodiment, said description being made with reference to the appended drawings, of which

DETAILED DESCRIPTION OF THE INVENTION

First of all, a description shall be given of each of the components of the color printing machine, and then the operation shall be presented in following the progress, of a card through all the cycles of its printing.

Figure 1:
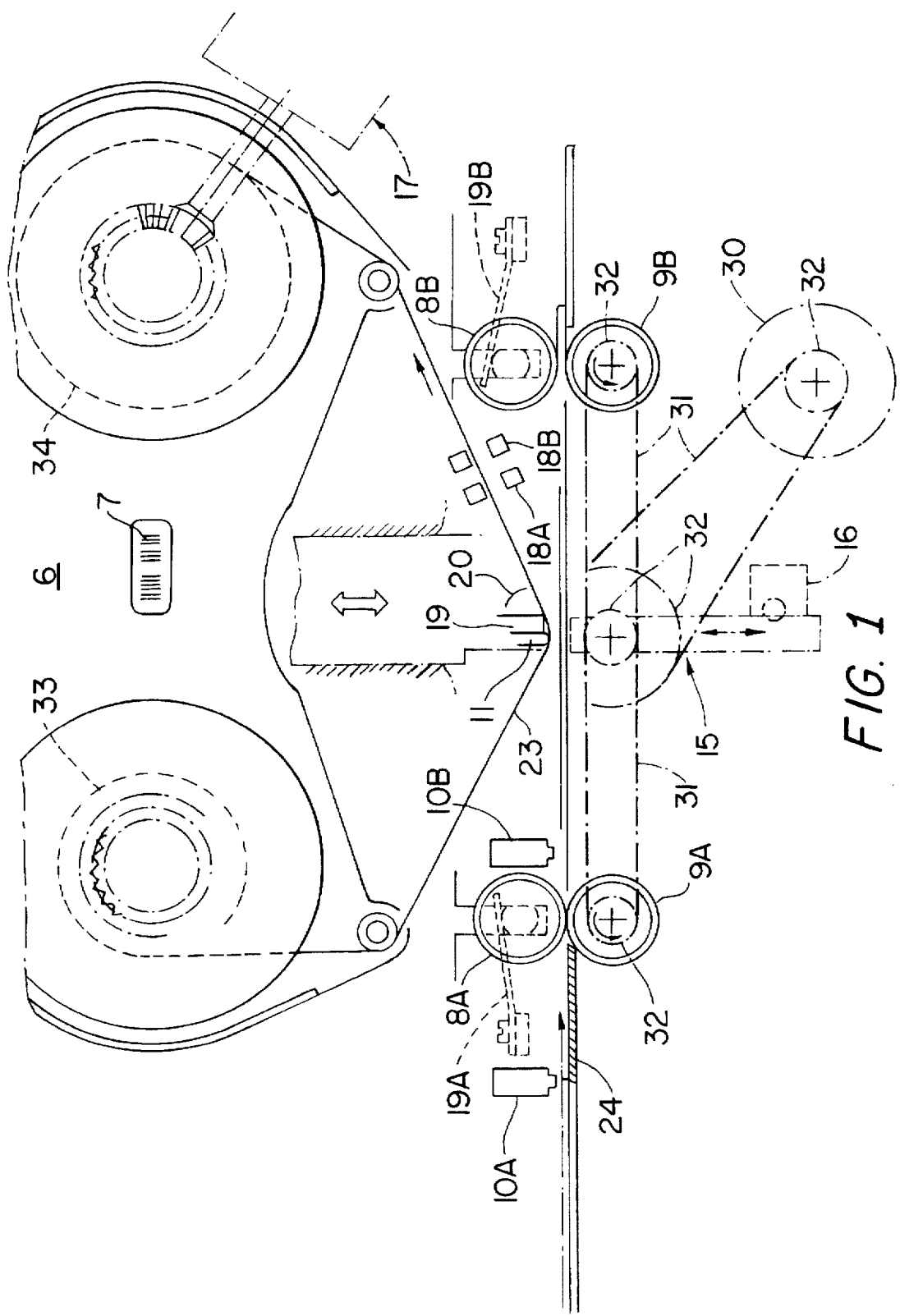
FIG. 1 is a front view of a color printing machine according to the invention.
Figure 3:
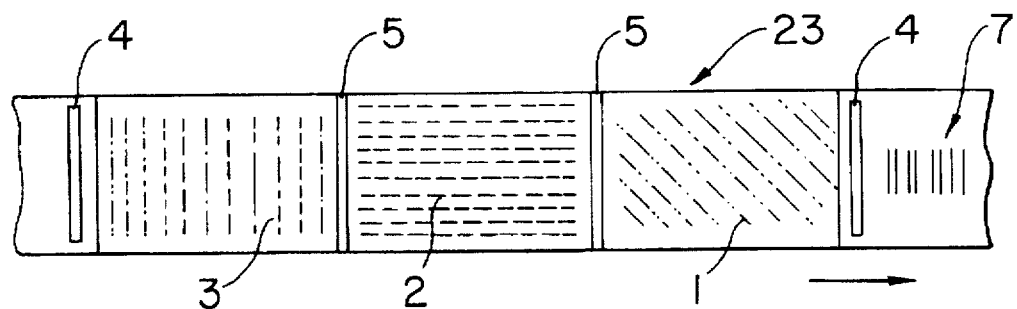
FIG. 3 shows a part of a strip supporting the coloring agents.
Figure 4:
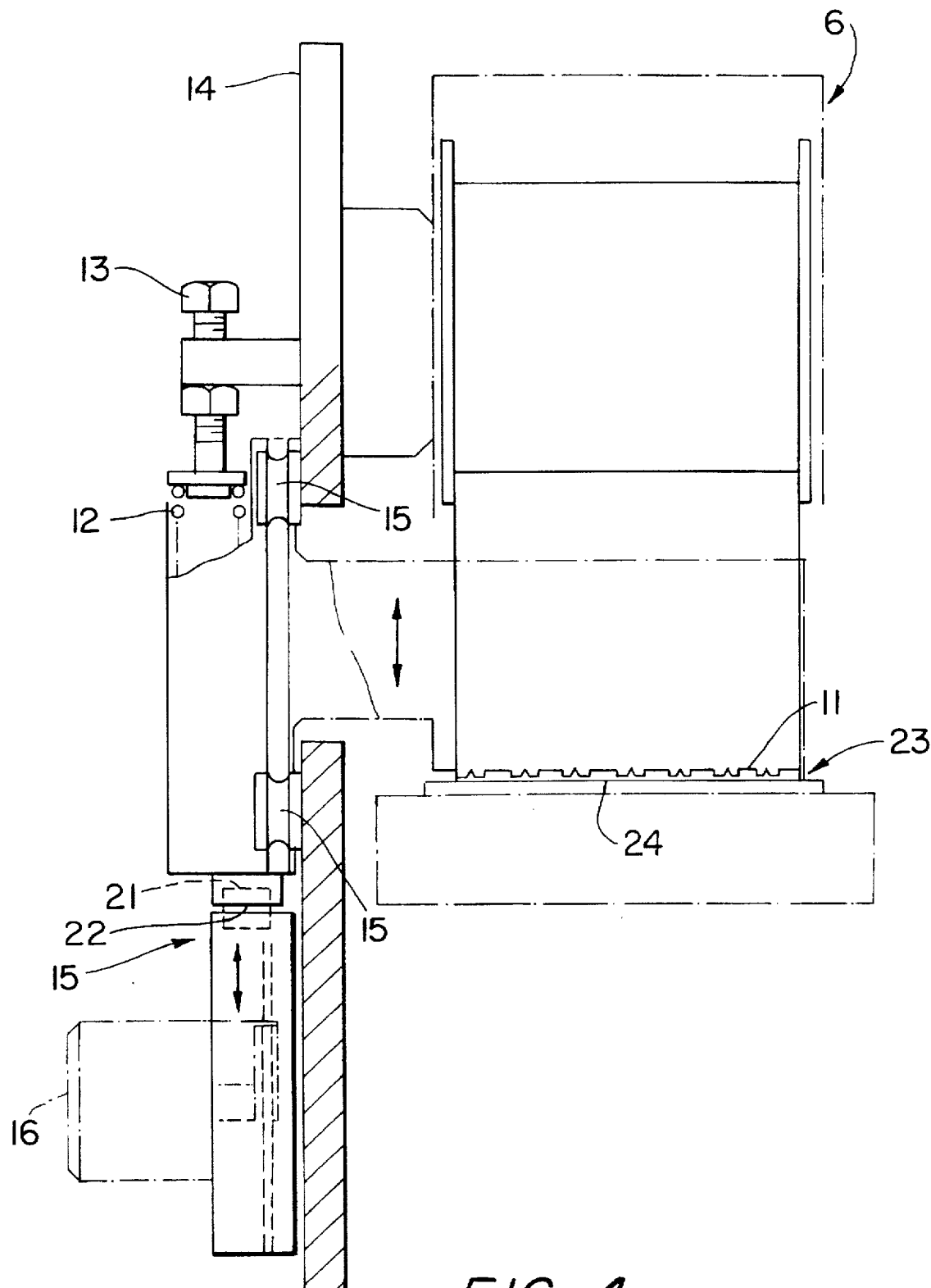
FIG. 4 is a sectional view of the printer head.

The color printing machine according to the invention uses a ribbon 23 (FIGS. 1 and 3), that constitutes a supporting structure for coloring agents arranged sequentially in the following order: yellow 1, magenta 2, cyan 3. Each segment of three colors is separated from the next one by a black indicator marker 4 having a length of 15 millimeters. Each color is separated from the next one by a black strip having a length of 5 millimeters and called a separator 5. The length of each color is generally identical but may be variable as a function of the length of the card and of the regions to be printed on this card. The separators 5 have a length substantially equal to half that of the indicators 4.

The ribbon is rolled in a cartridge 6 provided with a code 7, for example a bar code, that enables the encoding of the features of colorimetry and of heating time for the transfer of the coloring agents. As an alternative embodiment, this code may also be printed on the beginning part of the ribbon. This code is detected by a detection device that may or may not be optical and is not shown in the figures, the position of which depends on the position-of the code.

The cartridge 6 has a structure in which a storage reel 33 for the ribbon 23 and a receiver reel 34 can rotate.

In addition to the three coloring agents mentioned above, the ribbon may have a region coated with a protective film, having a variable length, designed to be transferred to the card after printing. The sequential segment then has four distinct regions, three separators and one indicator marker.

The card to be printed 24 is shifted by a drive system having two series of rollers: press rollers 8A and 8B, biased by spring rollers 19A and 19B, above the card; and drive rollers 9A and 9B below the card that are driven by a reversible electrical motor 30 and a set of belts 31, gear wheels and pulleys 32. The drive system is provided with a detection device 10 for the detection of the entry (10A) and exit (10B) of the card by means of optical cells that are positioned on either side of the first rollers 8A and 9A.

Figure 2:
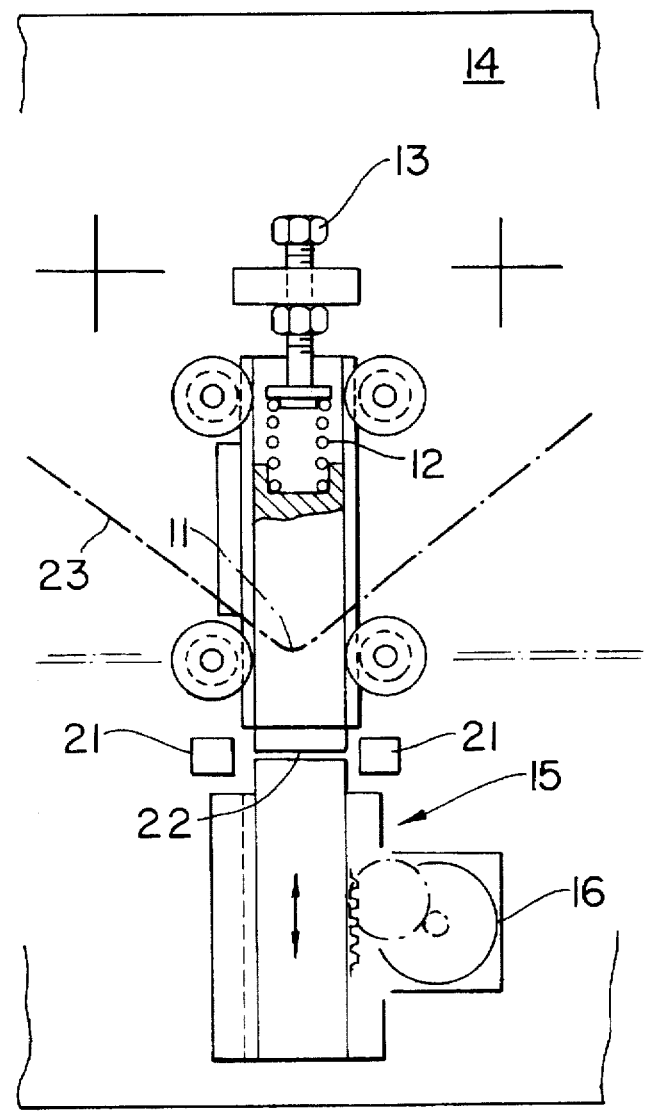
FIG. 2 is a rear view of the printer head of the printing machine.

The transfer of the coloring agents and other substances from the ribbon 23 to the card 24 to be printed is done by a thermal printer head 11 that exerts a pressure, on the ribbon and the card to be printed, that may be made to vary by means of a calibrated spring 12 (FIG. 2) which is adjustable by means of a screw 13. The upward and downward motion of the printer head is done along a guiding rail 14. This motion is achieved by a linear actuator 15 driven by a motor 16. With the linear actuator, there is associated a detection device 21 for the detection, by means of optical cells, of the position of the thermal head.

Figure 5:
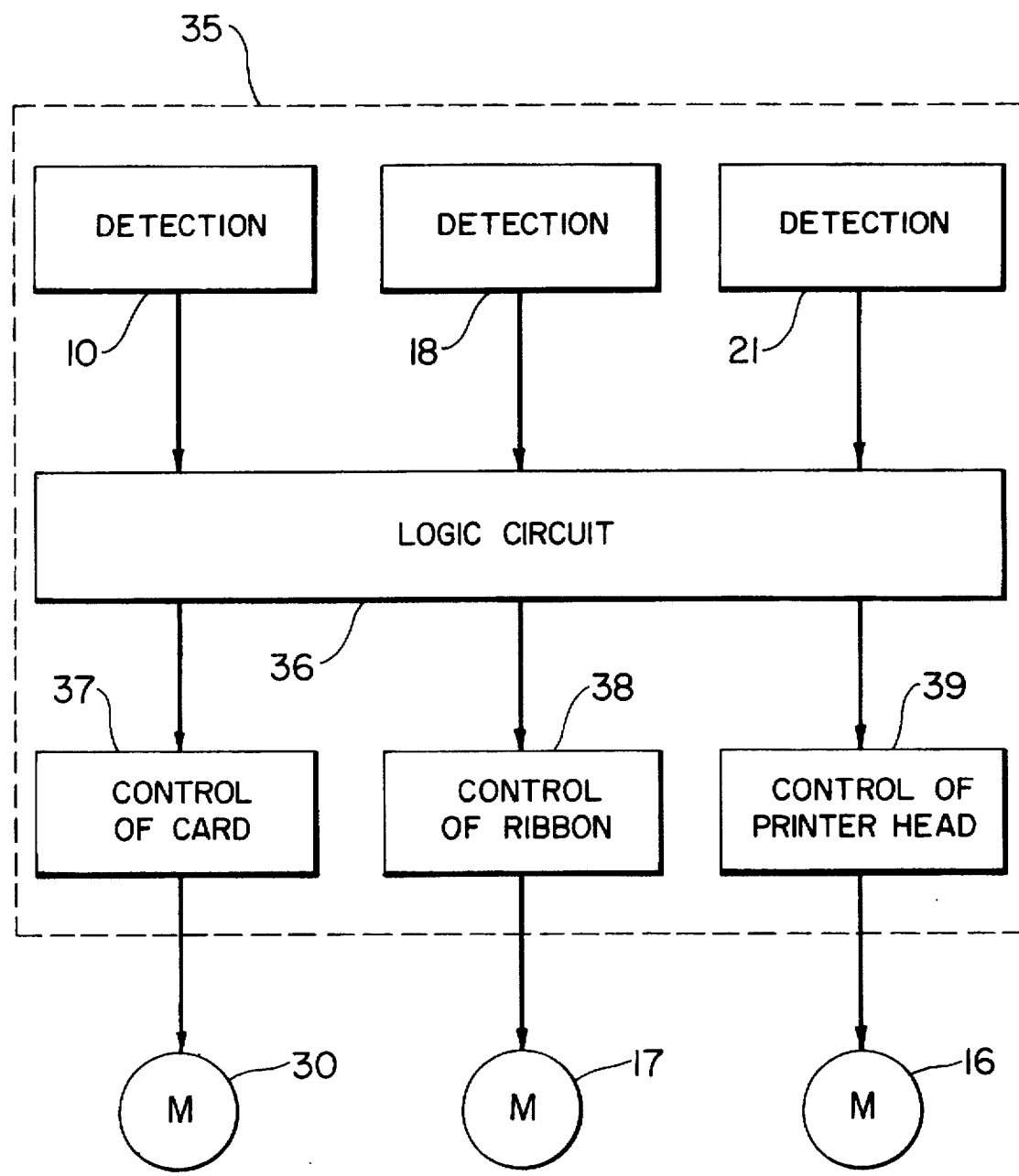
FIG. 5 is a block diagram of the control system of the printing machine.

The receiver reel 34 of the ribbon cartridge is driven by a stepping motor 17, the driving pulses of which are given by a driving system 35 (FIG. 5).

The position of the ribbon is detected by a detection device 18 having two pairs 18A, 18B of optical cells that are positioned after the printer head in the direction of the movement of the ribbon beneath this printer head and at a distance of 7½ millimeters from each other, for example.

A flattener device 19 is connected to the thermal printer head, the base of the flattener, which is semicircular, being raised by 0.5 to 1 mm with respect to that of the printer head.

The axes of the two elements are at a distance of 10 millimeters from each other.

The flattener determines an escape angle 20 that is imposed on the ribbon.

The motors 16, 17 and 30 are controlled by a control system 35 (FIG. 5) comprising:

the detection devices 10, 18 and 21, a logic circuit 36, of the microprocessor type, that receives the detection signals given by the detection devices 10, 18 and 21 and elaborates signals applied to devices for controlling the motors 16, 17 and 30, a device 37 for controlling the motor 30 to make the card 24 move under the thermal head in both directions, a device 39 to control the motor 16 of the thermal printer head enabling the thermal printer head to be brought into contact with the ribbon and the card to be printed and to release the head during the translation of the card, a control device 38 to control the motor 17 of the receiver reel 34 firstly so that each coloring agent or substance is successively positioned as a function of the translation of the card to be printed beneath the thermal printer head and, secondly, so as to maintain a constant running speed of the ribbon beneath the head despite the increase of the diameter of the load of the reel at each rotation.

The printer works as follows. When the card 24 is presented in the feed system, it is detected by the detection device 10A, 10B which activates the drive rollers 9 by means of the logic circuit 36 and the control device 37. The thermal printer head 11 gets positioned against the card by means of the linear actuator 15 which makes the head move down along the guiding rail 14 until the detection device 21 detects a determined space 22 and cuts off the supply to the motor 16 of the linear actuator. As a result of this, the spring 12 exerts constant pressure on the card.

The system for positioning of the thermal printer head enables to exert, irrespectively of the thickness of the card, a constant pressure on the ribbon 23 and the card 24 for obtaining the high-definition quality of the printing.

The cards used are considered to comply with the ISO standard 7816-2, their thickness ranging from 0.680 to 0.840 mm. Owing to the use of the press rollers 8A and 8B, whose vertical position may vary, the printer can process cards having different thicknesses.

The driving of the card 24 is synchronized with the presenting of the yellow color on the ribbon, namely the detection of the indicator 4. When the entire card is printed in yellow (with the detection of the first separator 5), the ribbon 23 stops being driven while the thermal printer head rises slightly under the effect of the linear actuator. The card, under the thrust of the drive rollers, the rotation of which is reversed, returns to its initial base precisely positioned by the detection device 10B. A second translation and then a third translation occur for the colors magenta and cyan, and a fourth translation as the case may be for the deposit of a protective film or of any other substance.

High-definition quality printing implies perfect synchronization of the card feeding speed and the speed at which the ribbon runs beneath the thermal printer head. Now, the running speed of the ribbon varies as a function of the increase of the diameter of the ribbon on the receiver reel 34. To obtain perfect synchronization, a stepping motor is used to drive the shaft of the receiver reel 34. The activation of this motor is subordinated to the shifting of the indicator markers 4 and separator markers 5 between the cells of the detection device 18. The detection of a 15 mm indicator band announces the start of the presenting of a three-color segment. The detection of a 5 mm band gives warning about a change of color.

The distance between the two pairs of cells, which is 7.5 millimeters, makes it possible to eliminate any source of error about the nature of the marker detected: i.e. whether it is an inter-segment or inter-colorant marker.

This fixed distance of 7.5 millimeters is used as a basis for counting the length of the ribbon used that has to be wound on the receiver reel 34 the diameter of which increases at each turn. The counting of the length of the ribbon used determines the actuation of the stepping motor 17, thus giving a system for the servo-linking of the winding control with the running speed of the ribbon beneath the thermal printer head which is itself synchronized with a constant speed at which the card is driven by the rollers.

A device for controlling the speed of the ribbon is described in the French patent application No. 94 02118 entitled: "SYSTEM AND METHOD FOR CONTROLLING THE WINDING OF A RIBBON ON A RECEIVER REEL" filed on Feb. 24, 1994 by the present Applicant.

The method for the thermal transfer of the coloring agents from the ribbon to the card implies a modulation of the temperature of the thermal head as a function of the color: the dark colors require higher temperature than the light colors. For the printing of the dark colors, this technical imperative tends to cause the slight clinging or adhesion of the ribbon to the card owing to the softening of the plastic components, the consequence of which is that there are printing defects as well as additional and unwanted driving of the card by the clinging ribbon, causing other printing defects.

To overcome these drawbacks, a flattener device 19 is used, the function of which is to modify the escape angle or release angle 20 of the ribbon in order to bring about the creation, in the 10-millimeter path between the axes of the thermal printer head and the flattener, of a region of lower stress on the ribbon, a sort of belly that delays the pulling of this ribbon during the printing, enabling the spread of the coloring agent into the material of the card, the time lag being furthermore sufficient to cool both card and ribbon.

At the end of the last forward translation of the card, to transfer a color or the protective film, the machine that has ended a printing itself may fit out the card with memory devices, chips or magnetic tapes according to known methods.

Three printing speeds are programmed. Expressed in terms of 1 millimeter travelled in milliseconds, the performance characteristics are: 228, 119 and 57 for the highest speed.

What is claimed is:

1. A machine for the color printing of cards, particularly cards made of plastic, comprising:

a ribbon used as a support for a plurality of repeating sequences of coloring agents and substances arranged in a sequential order, each sequence of coloring agents and substances being preceded by an indicator, a thermal printer head enabling the transfer of a coloring agent or substance form the ribbon to a card by thermal effect, a first driving means to drive the ribbon under the thermal printer head, a second driving means to drive the card to be printed under the thermal printer head and the ribbon, a third driving means to shift the thermal printer head so as to make it approach or move away from the card, wherein:

the ribbon has separators between the coloring agents and substances of a sequence, a first detection device detects the separators and each indicator during the running of the ribbon, a second detection device detects the entry and exit of the card under the thermal printer head, a control system, including the first and second detection devices in addition to a third detection device, the control system controlling the first, second and third driving means so as to present the card to be printed under the thermal printer head as many times as there are coloring agents and substances in the sequence.

2. A printing machine according to claim 1, wherein the separators between the coloring agents and substances have a length different from that of each indicator between the sequences and have a color different from that of the coloring agents and substances.

3. A printing machine according to claim 2, wherein the separators have a length substantially equal to half that of the indicator.

4. A printer according to claim 2, wherein each indicator and the separators are black.

5. A printer according to claim 1, wherein the first detection device for the detection of each indicator and the separators comprises two elementary detection cells separated by a distance enabling each indicator to be distinguished from the separators.

6. A printing machine according to claim 5, wherein the first detection device is positioned after the thermal printer head in the direction of the running of the ribbon.

7. A printing machine according to claim 1, wherein the second detection device comprises a first elementary cell positioned at the input of the machine to detect the entry of the card to be printed and a second elementary cell, positioned before the thermal printer head to determine the position of the card with reference to the thermal printer head.

8. A printing machine according to claim 1, wherein the third detection device comprises an elementary cell that detects the position of the thermal printer head with reference to the card to be printed on so as to stop the third driving means as soon as a determined space is detected.

9. A printing machine according to claim 1, wherein the control system comprises, in addition to the first, second and third detection devices:

a logic circuit that carries out logic operations on the signals given by the first, second and third detection devices and gives control signals, a first device to control the first driving means so as, firstly, to successively position each coloring agent as a function of the translational movements of the card to be printed on beneath the thermal printer head and, secondly, to maintain a constant running speed of the ribbon beneath the thermal printer head despite the increase in the diameter of the receiver reel, a second device to control the second driving means so as to successively present the card several times beneath the thermal printer head by a series of back-and-forth translational movements, and a third device to control the third driving means to bring the thermal printer head into contact with the ribbon and the card to be printed on during a translational movement in the running direction of the ribbon, and to release it during the reverse translational movement of the card to be printed on.

10. A printing machine according to claim 1, wherein the thermal printer head is provided with a flattener device that modifies the escape angle of the ribbon so as to delay the pulling of said ribbon.

11. A printing machine according to claim 10, wherein the flattener device has a base in contact with the ribbon that is semi-circular, raised by about one millimeter with respect to the base of the printer head and placed at a distance of about ten millimeters from the base of said head in the running direction of the ribbon.

12. A printing machine according to claim 1, wherein the second driving means comprise driving rollers and associated press rollers, the latter being fitted out with springs so as to enable the vertical shifting of the press rollers as a function of the thickness of the card to be printed on while maintaining a constant pressure.

* * * * *